(12) United States Patent
Eble

(10) Patent No.: US 11,478,975 B2
(45) Date of Patent: Oct. 25, 2022

(54) SYSTEM AND METHOD FOR FORMING CONTAINERS USING BLOW MOLD AND ELECTRIC HEATING ELEMENTS

(71) Applicant: Pretium Packaging, L.L.C., Chesterfield, MO (US)

(72) Inventor: Raymond C. Eble, Sugarloaf, PA (US)

(73) Assignee: Pretium Packaging, L.L.C., Chesterfield, MO (US)

( * ) Notice: Subject to any disclaimer, the term of this patent is extended or adjusted under 35 U.S.C. 154(b) by 2 days.

(21) Appl. No.: 16/949,133

(22) Filed: Oct. 15, 2020

(65) Prior Publication Data

US 2021/0107205 A1    Apr. 15, 2021

Related U.S. Application Data

(60) Provisional application No. 62/915,233, filed on Oct. 15, 2019.

(51) Int. Cl.
| | | |
|---|---|---|
| *B29C 49/48* | (2006.01) | |
| *B29C 49/70* | (2006.01) | |
| *B29C 49/12* | (2006.01) | |
| *B29B 11/08* | (2006.01) | |
| *B29C 49/06* | (2006.01) | |
| *B29L 31/00* | (2006.01) | |
| *B29C 49/78* | (2006.01) | |

(52) U.S. Cl.
CPC .......... *B29C 49/4823* (2013.01); *B29B 11/08* (2013.01); *B29C 49/06* (2013.01); *B29C 49/12* (2013.01); *B29C 49/78* (2013.01); *B29C 2049/4838* (2013.01); *B29C 2049/4854* (2022.05); *B29C 2049/4889* (2013.01); *B29L 2031/712* (2013.01)

(58) Field of Classification Search
CPC ........ B29C 49/4823; B29C 2049/4838; B29C 2049/4841; B29C 2049/704; B29C 2049/701; B29C 49/70
See application file for complete search history.

(56) References Cited

U.S. PATENT DOCUMENTS

| | | | | |
|---|---|---|---|---|
| 4,547,333 | A | * | 10/1985 | Takada .................... B29C 49/12 264/531 |
| 6,109,907 | A | | 8/2000 | Takada et al. |
| 7,581,942 | B2 | | 9/2009 | Richards et al. |
| 7,887,315 | B2 | | 2/2011 | Lane |
| 2012/0132608 | A1 | * | 5/2012 | Aoki .................... B29C 49/6481 215/40 |

(Continued)

*Primary Examiner* — Robert B Davis
(74) *Attorney, Agent, or Firm* — Armstrong Teasdale LLP

(57) ABSTRACT

A system for forming a container includes an injection station configured to inject a liquid material into a mold to form a preform. The system also includes a forming station including an apparatus for forming a container. The apparatus includes a blow mold configured to receive the preform and inject air into the preform to form the container. The blow mold includes an inner mold surface. The apparatus also includes at least one stretching rod configured to contact the preform in the blow mold and stretch the preform. The apparatus further includes electric heating elements coupled to the blow mold and positioned adjacent the inner mold surface to heat the inner mold surface. The system further includes a removal station configured to release the container from the system.

22 Claims, 12 Drawing Sheets

(56) References Cited

U.S. PATENT DOCUMENTS

2014/0377394 A1* 12/2014 Le Pechour ............ B29C 49/38
                                                        425/144
2018/0162037 A1*  6/2018 Chomel .............. B29C 49/4823

* cited by examiner

SYSTEM AND METHOD FOR FORMING CONTAINERS USING BLOW MOLD AND ELECTRIC HEATING ELEMENTS

CROSS-REFERENCE TO RELATED APPLICATIONS

This application claims priority to U.S. Provisional Patent Application Ser. No. 62/915,233, filed Oct. 15, 2019, the disclosure of which is incorporated herein by reference in its entirety.

BACKGROUND

This disclosure is directed to a system for forming containers, and more specifically to a container forming system including a blow mold and electric heating elements.

In container forming systems, containers are formed at a forming station using forming processes such as blow molding processes. In conventional container forming systems, a plurality of molds are mounted on a block and configured to receive the preforms at the forming station. During typical blow molding processes, air is injected into the preforms positioned within the mold cavities and the preforms are stretched to form containers. To facilitate forming the containers, heat is provided to the molds via the block. For example, a hot liquid is channeled through the block and used to deliver heat to the molds. However, conventional heating apparatus for container forming systems have not been completely satisfactory. For example, in systems that rely on block heating for the molds, the block expands as the hot liquid is channeled through it and, as a result, the alignment of the molds mounted to the block may change during operation of the system. Some systems that utilize block heating include equipment to account or compensate for the expansion of the block and the resulting changes in alignment of the molds during operation. However, such equipment is often costly and complex to implement. In addition, some conventional heating apparatus do not provide uniform heating of the mold surface during the blow molding process.

Therefore, a need exists for a container forming system that includes an improved heating apparatus for blow molds.

BRIEF DESCRIPTION OF THE DISCLOSURE

In one aspect, a system for forming a container includes an injection station configured to inject a liquid material into a mold to form a preform. The system also includes a forming station including an apparatus for forming a container. The apparatus includes a blow mold configured to receive the preform and inject air into the preform to form the container. The blow mold includes an inner mold surface. The apparatus also includes at least one stretching rod configured to contact the preform in the blow mold and stretch the preform. The apparatus further includes electric heating elements coupled to the blow mold and positioned adjacent the inner mold surface to heat the inner mold surface. The system further includes a removal station configured to release the container from the system.

In another aspect, an apparatus for forming a container includes a blow mold configured to receive a preform and inject air into the preform to form the container. The blow mold includes a first half, a second half, and a base. The first half and the second half collectively define an inner mold surface. The base includes a push-up portion. The blow mold is positionable between an open position and a closed blow molding position. The apparatus also includes at least one stretching rod configured to contact the preform within the blow mold and stretch the preform while the air is injected into the preform. The apparatus further includes electric heating elements positioned in the first half and the second half adjacent the inner mold surface to heat the inner mold surface.

In yet another aspect, a method of forming a container by blow molding includes positioning a preform in a cavity of a blow mold. The blow mold includes an inner mold surface defining the cavity. The method also includes heating the inner mold surface using electric heating elements coupled to the blow mold. The electric heating elements are positioned adjacent the inner mold surface. The method further includes stretching the preform using at least one stretching rod and injecting air into the preform such that the preform expands and contacts the heated inner mold surface to form the container.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION OF THE DISCLOSURE

The present disclosure is directed to container forming systems that include forming stations having a blow mold and electric heating elements, and high-crystallinity containers formed therefrom. The electric heating elements are coupled to the blow mold and positioned adjacent an inner mold surface of the blow mold. In some embodiments, the electric heating elements heat the inner mold surface to deliver heat to a preform received in the blow mold and facilitate forming the preform into a container. As a result, the electric heating elements deliver heat to the preform in a more direct and efficient manner than at least some known systems. In addition, the system is able to precisely control the heat provided to different portions of the preform. In some embodiments, the system includes a controller communicatively coupled to the electric heating elements and configured to control a supply of electrical current from a power source to the electric heating elements according to a target temperature. Accordingly, the system allows the blow mold and the preform to reach a desired temperature in a reduced time and with increased operating efficiency compared to conventional systems. For example, a greater amount of heat from the electric heating elements is transferred towards the inner mold surface than towards a frame supporting the blow mold. In some embodiments, the system includes one or more vents to allow cooling airflow between the electric heating elements and the frame. In addition, the system facilitates even heating of the inner mold surface or, optionally, provides varying amounts of heat to target areas of the inner mold surface. Accordingly, the system is able to form containers with areas having different features without requiring a separate step or tool to form the features. Moreover, the system may produce less heat because the system more efficiently utilizes the heat provided by the electric heating elements. Embodiments of containers formed using the container forming systems, such as plastic containers, can have a higher degree of crystallinity as compared to other containers as a result of the improved heating of the mold surfaces. Because the maximum recommended fill temperature of a plastic container is directly related to the degree of crystallinity of the container, plastic containers of the present disclosure can have a higher maximum recommended fill temperature than other plastic containers. This, in turn, can facilitate container filling processes, for example, by reducing or eliminating a cooling time often employed by container filling plants to cool contents (e.g., liquids) prior to the contents being placed in the containers.

Figure 1:
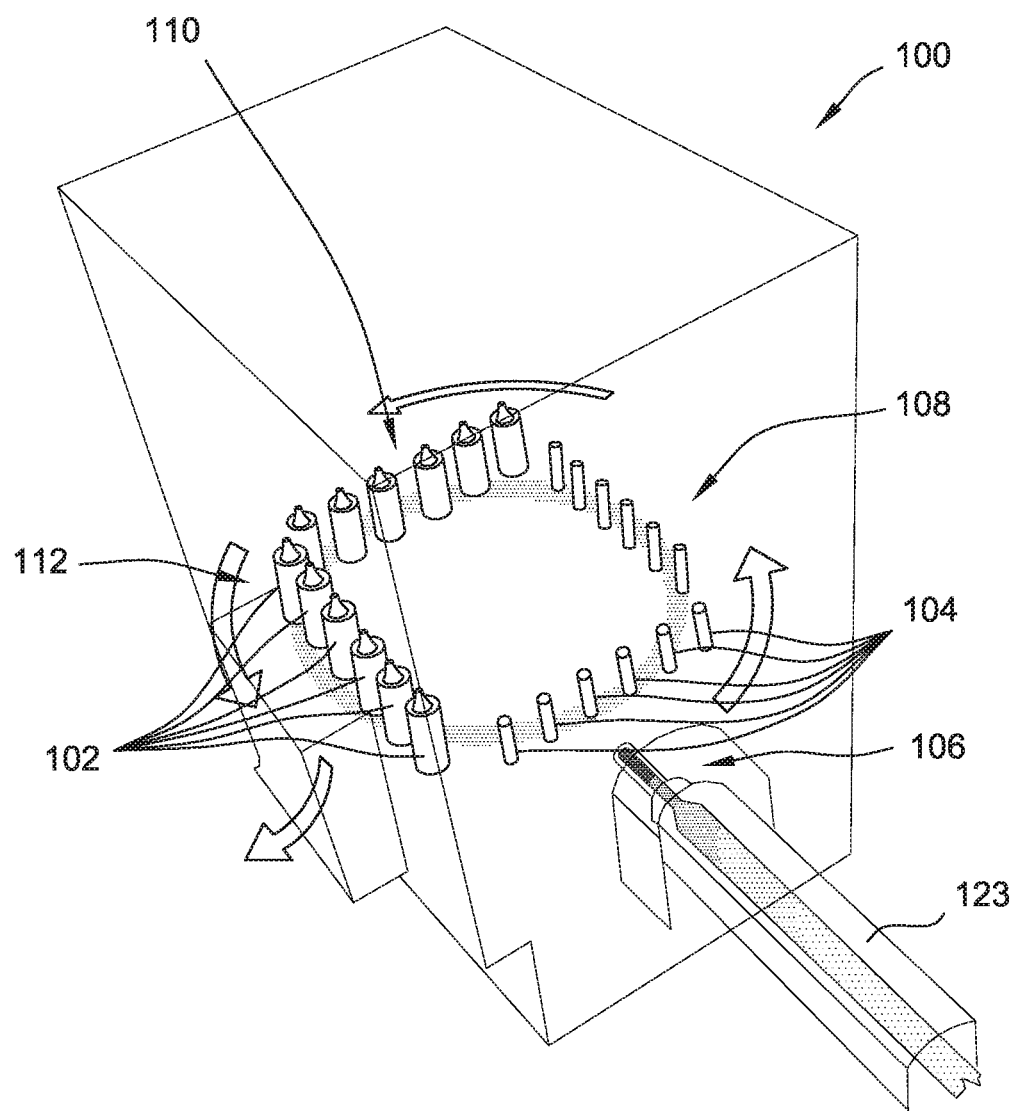
FIG. 1 is a schematic view of an exemplary system for forming a container.
Figure 2:
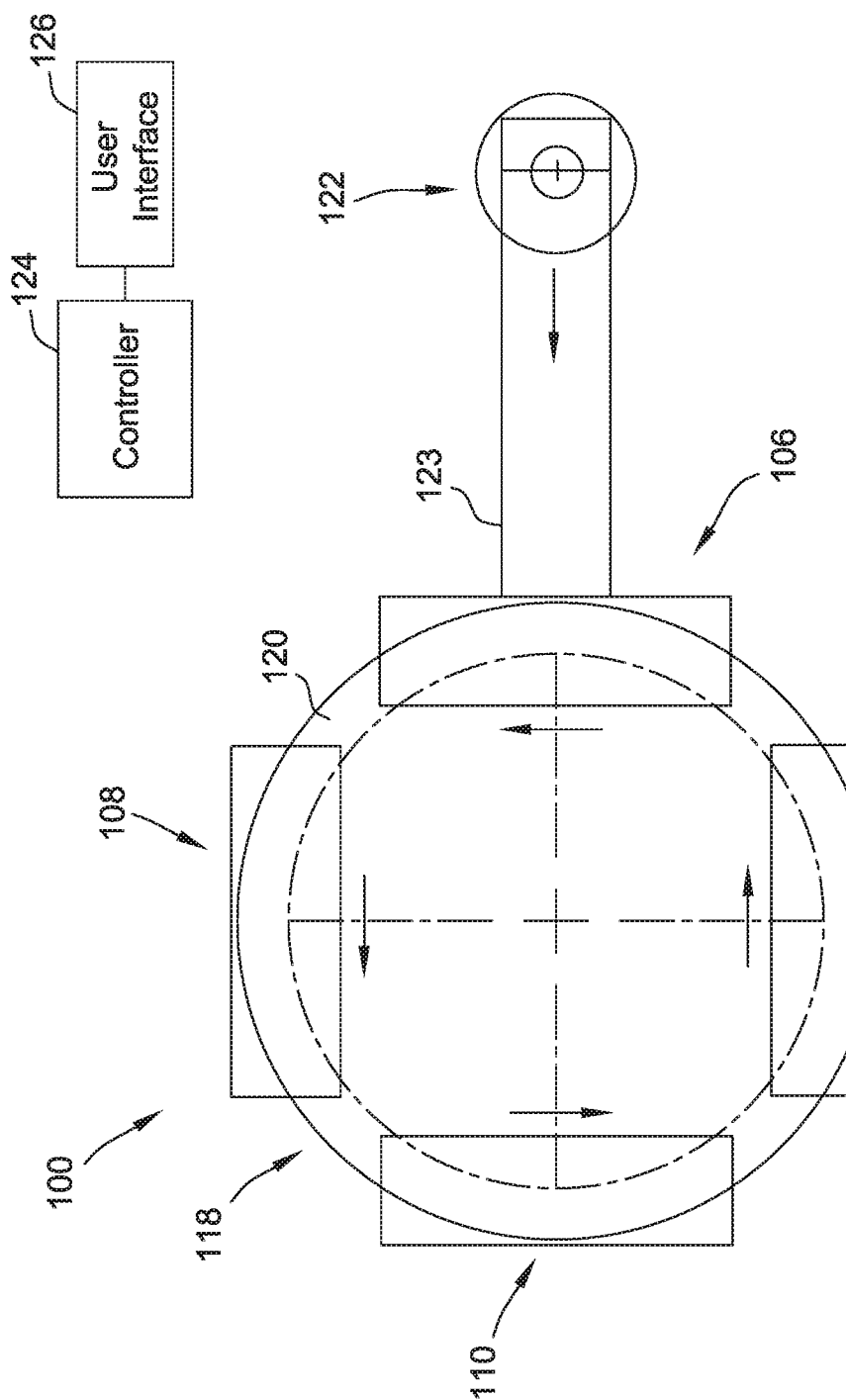
FIG. 2 is another schematic view of the system shown in FIG. 1.

FIGS. 1 and 2 are schematic views of an exemplary container forming system 100 used to form one or more containers, such as containers 102, from a preform 104. The container forming system 100 may be used to form containers 102 from a variety of materials, including, for example and without limitation, plastic, polyethylene, polyethylene terephthalate, high density polyethylene, polypropylene, and polyvinyl chloride. For example, in some suitable embodiments, polyethylene terephthalate is used to form containers 102 that are configured to withstand relatively high temperatures for hot fill applications.

In the illustrated embodiment, the container forming system 100 includes an injection station 106, a conditioning station 108, a forming station 110, and a removal station 112. In other embodiments, one or more of the injection station 106, the conditioning station 108, the forming station 110, and the removal station 112 may be omitted. In the example embodiment, the forming station 110 is a blow-molding station. More particularly, the forming station 110 is an injection-stretch-blow-molding station that includes a blow mold 114 (shown in FIG. 3) and a plurality of electric heating elements 116 (shown in FIG. 4). In some embodiments, the system 100 includes other suitable stations, in addition to or as an alternative to the injection station 106, the conditioning station 108, the forming station 110, and the removal station 112, a laminating station, a carving or cutting station, a deflashing station, and/or any other stations.

Figure 3:
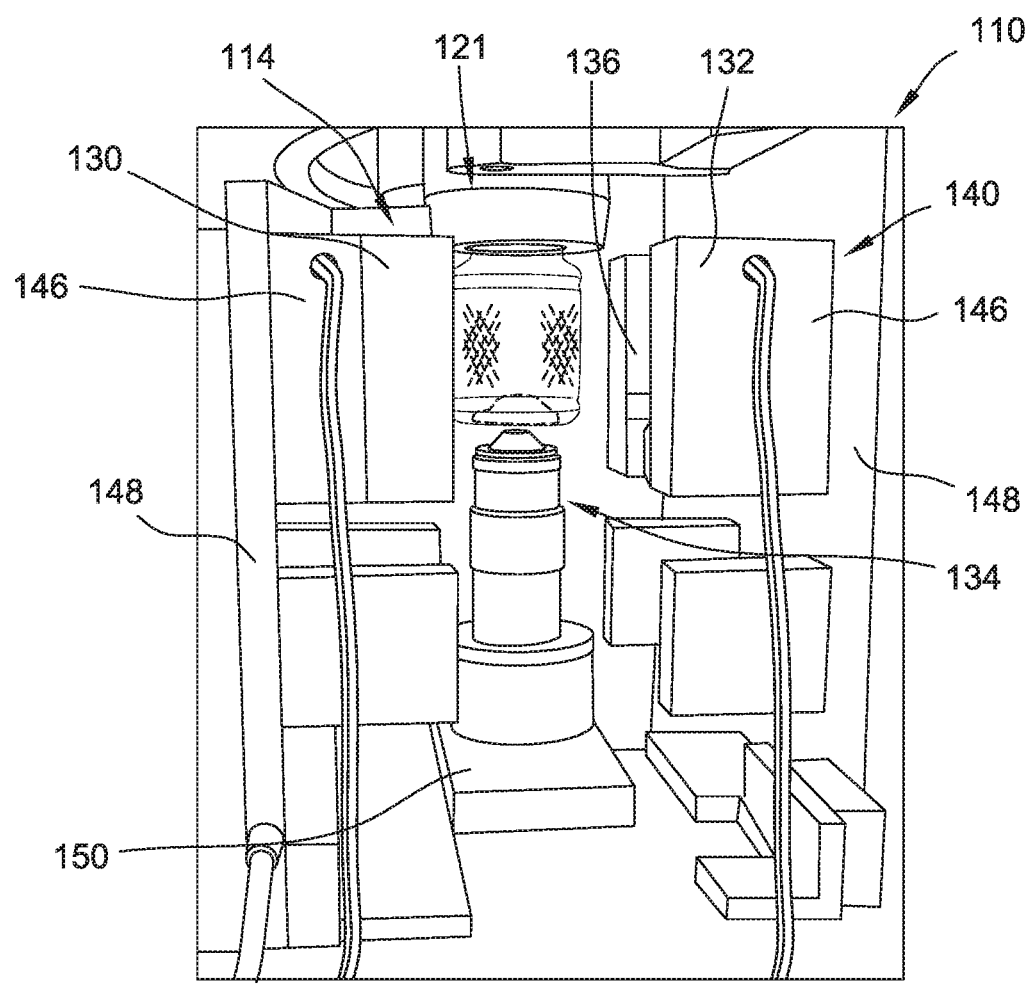
FIG. 3 is a perspective view of a forming station of the system shown in FIG. 1, with a blow mold of the forming station illustrated in an open position.

A transport apparatus 118 is configured to transport the preform 104 or the container 102 to and/or from the injection station 106, the conditioning station 108, the forming station 110, and the removal station 112. For example, the transport apparatus 118 may include a track 120 and carriages 121 (shown in FIG. 3) configured to carry the preforms 104 or the containers 102 along the track 120 to and/or from at least one of the stations. In the illustrated embodiment, the track 120 is circular and the carriages 121 are moved along the track by a drive system (not shown) in a continuous loop. The drive system may include any suitable drive components that enable the system 100 to function as described herein including, for example and without limitation, endless belts or chains driven by pulleys or sprockets. In some embodiments, the carriages may be configured to hold the necks of the preforms 104 and the containers 102 such that the preforms and containers are suspended from the carriages as they are moved along the track 120, as shown in FIG. 3. In alternative embodiments, the system 100 may include any transport apparatus 118 that enables the system 100 to operate as described herein.

In some embodiments, the container forming system 100 includes a plurality of container forming lines, each line including respective injection stations 106, conditioning stations 108, forming stations 110, and removal stations 112. In some embodiments, the container forming system 100 includes additional and/or alternative stations (not shown) along one or more of the container forming lines.

The system 100 may include a material treatment station 122 that prepares material for forming the preform 104. For example, in some embodiments, the material treatment station 122 includes a hopper, a feeding apparatus, and a melting apparatus (not labeled). The material treatment station 122 is configured to receive pellets and melt the pellets to provide the liquid material for injection in the molds. Prior to melting, the pellets may be dried at the material treatment station 122 to provide a desired moisture content. After drying, the feeding apparatus carries the pellets to the hopper and the pellets are fed from the hopper into the melting apparatus where the pellets are heated to a temperature sufficient to change the pellets from a solid state to a liquid state. Examples of pellets suitable for use with the system 100 include, for example and without limitation, plastic pellets, polyethylene pellets, polyethylene terephthalate pellets, and combinations thereof.

The system 100 may include a conduit 123 that transports the liquid material to the injection station 106. The injection station 106 may include a nozzle or other injection tool that injects the liquid material into molds to form parisons or preforms 104 (e.g., comprising plastic, polyethylene, polyethylene terephthalate, other polymeric materials, glass, etc.).

In some embodiments, the system 100 includes a conveyor that transports the preform 104 to the conditioning station 108. The conditioning station 108 may include at least one sensor (not shown) configured to measure the temperature of the preform or the temperature of the environment of the preform and at least one heater. For example, heaters at the conditioning station 108 may be positioned within and/or around the preform 104 to deliver heat to the preform 104.

The blow mold 114 is configured to receive the preform 104 at the forming station 110 and inject air into the preform to form the container 102. Accordingly, the container 102 is formed at the forming station 110 in a blow molding process. The removal station 112 includes a removal tool (not shown) that is configured to release the container from the system 100. For example, the removal tool may be configured to cut a thread of the container 102 to remove the container from the system 100.

In addition, the system 100 includes a controller 124 that communicates with one or more components of the system 100. The controller 124 includes a memory device and a processor to store and execute computer-executable instructions to control components of the container forming system 100. In some embodiments, the processor includes one or more processing units (e.g., in a multi-core configuration). The memory device may be any device that allows information such as executable instructions and/or other data to be stored and retrieved. Specifically, in some embodiments, the controller 124 includes, for example and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM).

In addition, the controller 124 includes or is coupled to a user interface 126 configured to receive input from and/or provide output to a user. In some embodiments, the user interface 126 includes one or more input devices, such as for example, a keyboard, a pointing device, a mouse, a stylus, a touch sensitive panel (e.g., a touch pad or a touch screen), a camera, a position detector, and/or an audio input device. In some embodiments, the user interface 126 includes one or more output devices, such as a display device (e.g., a liquid crystal display (LCD), organic light emitting diode (OLED) display, cathode ray tube (CRT), or "electronic ink" display) or an audio output device (e.g., a speaker or headphones). In some embodiments a single component such as a touch screen functions as both an output device and an input device of the user interface 126.

In some embodiments, the controller 124 is coupled to one or more components via a wired and/or a wireless connection. The controller may include a communication interface, which is communicatively couplable to any component of the container forming system 100. In some embodiments, the communication interface includes, for example, a wired or wireless network adapter or a wireless data transceiver for use with a local area network (LAN) or a wide area network (WAN), dial-in-connections, cable modems, special high-speed Integrated Services Digital Network (ISDN) lines, RDT networks, and/or a mobile phone network (e.g., Global System for Mobile communications (GSM), 3G, 4G or Bluetooth) or other mobile data network (e.g., Worldwide Interoperability for Microwave Access (WIMAX)).

Figure 4:
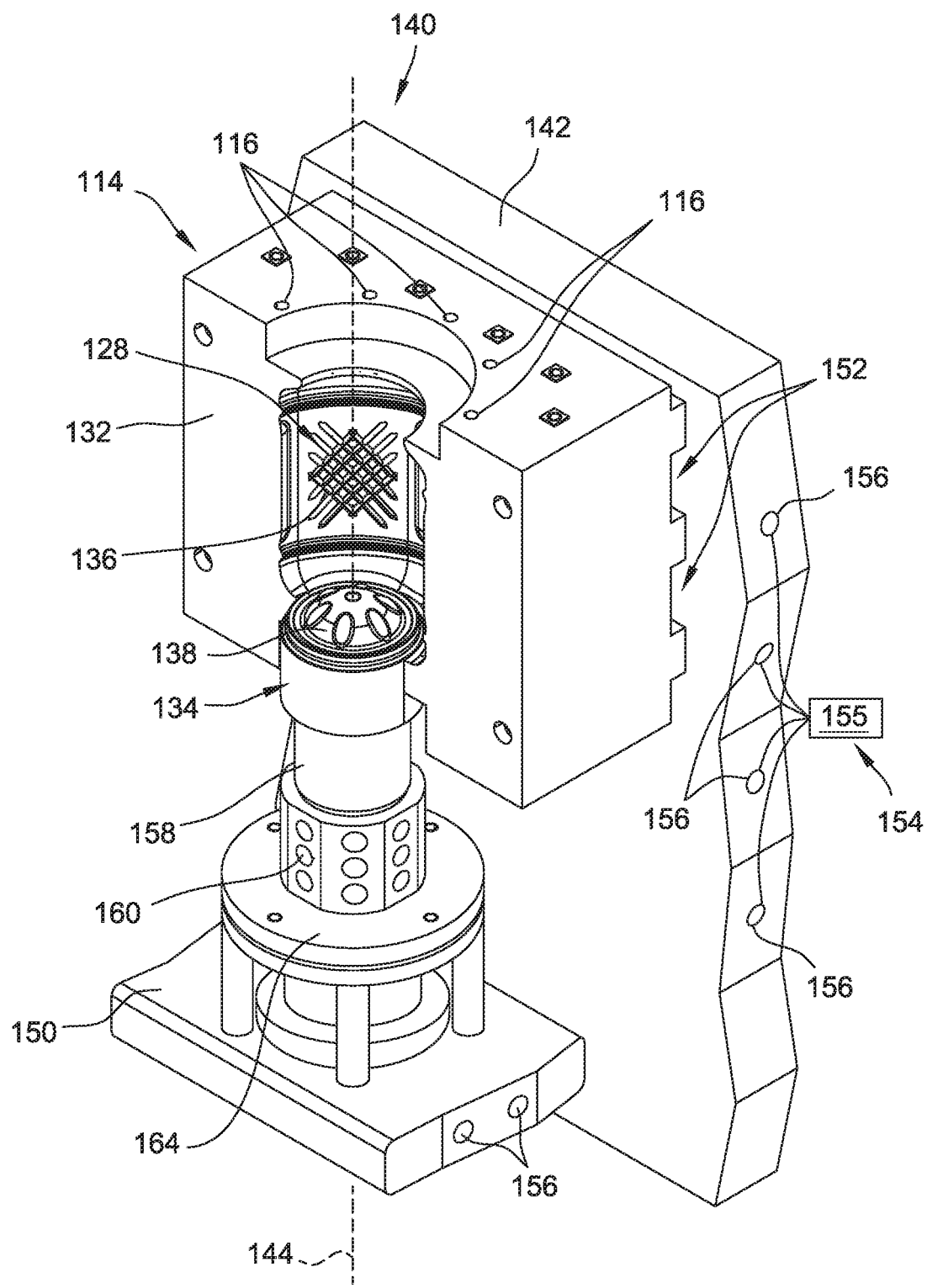
FIG. 4 is a perspective view of a portion of the forming station shown in FIG. 3, illustrating an inner surface of the blow mold.

FIG. 3 is a perspective view of the forming station 110 of the system 100, illustrating the blow mold 114 of the forming station in an open position. FIG. 4 is a perspective view of a portion of the forming station 110 shown in FIG. 3. The blow mold 114 is positionable between the open position and a closed, blow molding position (not shown in FIG. 3) using, for example, suitable mechanical actuators. The open position facilitates positioning the preform 104 (shown in FIG. 1) between the two halves of the blow mold 114 (described further below) and allows removal of a formed container 102 from the blow mold 114 after the blow molding process. During the blow molding process, the blow mold 114 is in the closed blow molding position and shapes the container 102 within a cavity 128 of the blow mold 114.

The blow mold 114 includes a first half 130, a second half 132, and a base 134. The first half 130 and the second half 132 define the cavity 128 in which the preform 104 is positioned and the container 102 is formed during the blow molding process. The first half 130 and the second half 132 also define an inner mold surface 136 that contacts and shapes the container 102 during the blow molding process. The base 134 includes a push-up portion 138 that shapes the bottom of the container 102. When the blow mold 114 is in the open position, the first half 130, the second half 132, and the base 134 are separated. When the blow mold 114 is in the closed position, the first half 130, the second half 132, and the base 134 are positioned adjacent one another such that surfaces from the respective components abut one another. In some embodiments, the first half 130, the second half 132, and/or the base 134 are movable to transition the blow mold 114 between the open position and the closed blow molding position. For example, in the illustrated embodiment, the first half 130 and the second half 132 move horizontally toward and away from each other when the blow mold 114 is moved between the open position and the closed, blow molding position. The base 134 is at least partially positioned between lower portions of the first half 130 and the second half 132 when the blow mold 114 is in the closed blow molding position. In alternative embodiments, the blow mold 114 has any configuration that enables the blow mold 114 to function as described herein. For example, in some embodiments, the base 134 is omitted and at least one of the first half 130 and the second half 132 includes a bottom portion configured to shape the bottom of the container 102.

Figure 5:
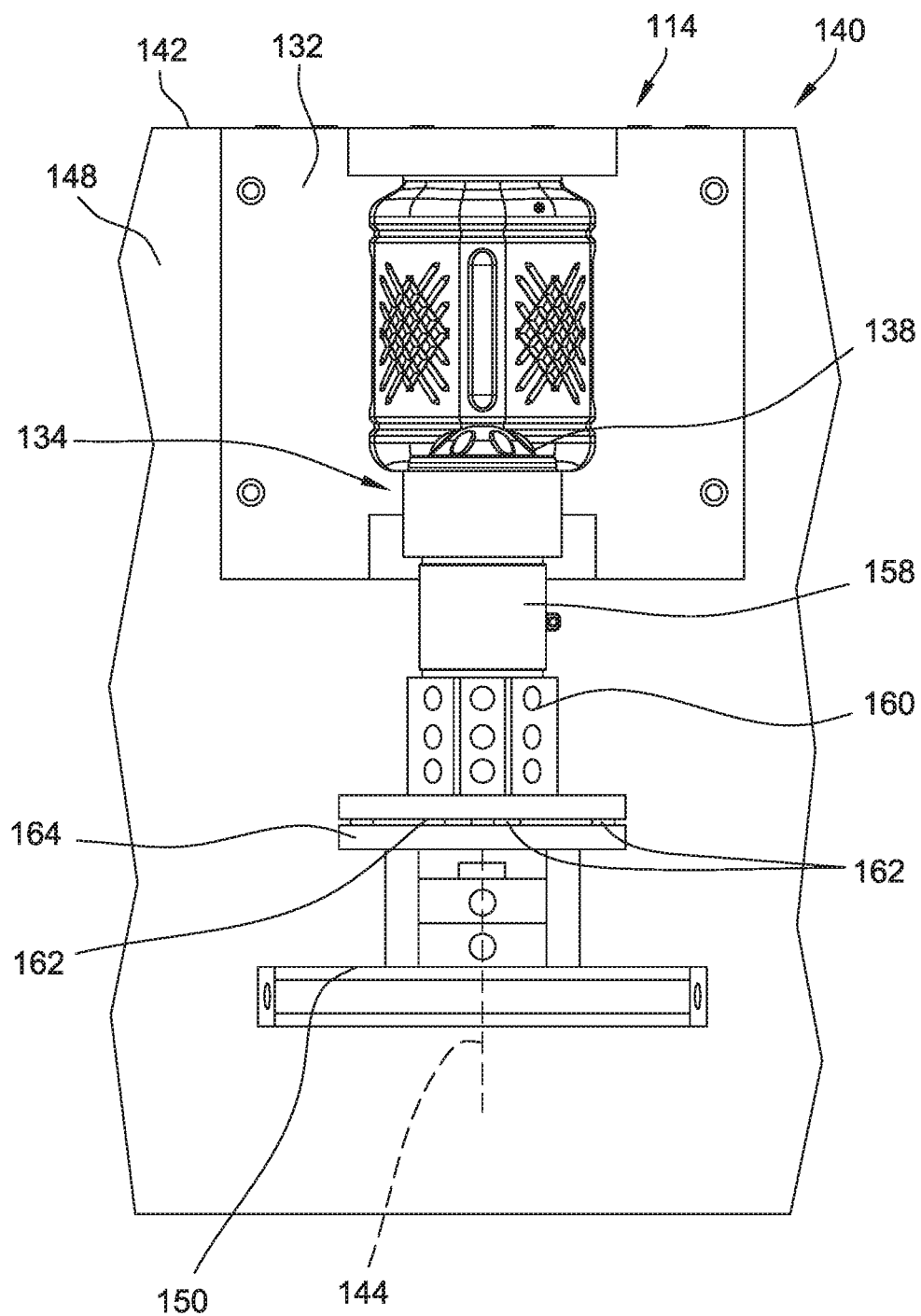
FIG. 5 is a side view of the portion of the forming station shown in FIG. 4.
Figure 6:
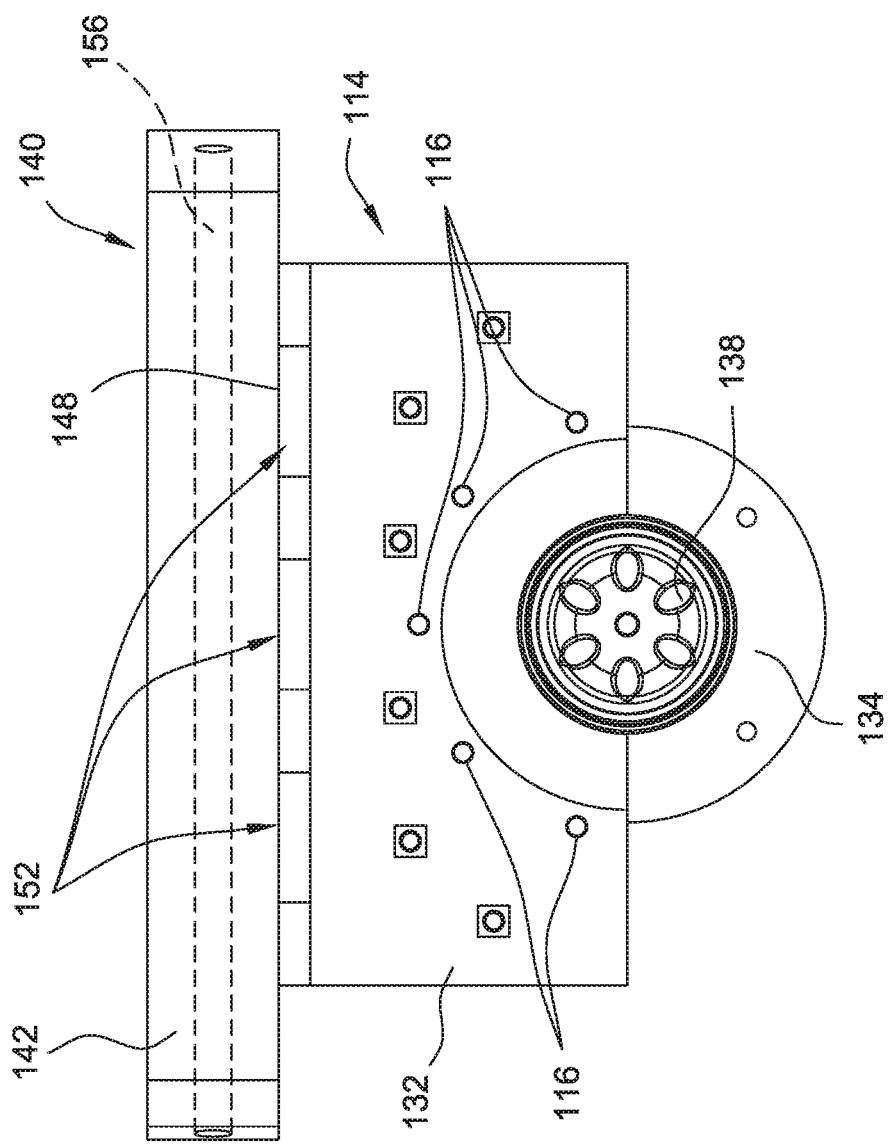
FIG. 6 is a top view of the portion of the forming station shown in FIGS. 4 and 5.

FIG. 5 is a side view of the portion of the forming station 110 shown in FIG. 4, and FIG. 6 is a top view of the portion of the forming station 110 shown in FIGS. 4 and 5. The forming station 110 includes a forming apparatus 140 that includes the blow mold 114, the electric heating elements 116, and a frame 142 supporting at least a portion of the blow mold 114. The electric heating elements 116 are positioned in the first half 130 (shown in FIG. 3) and the second half 132 of the blow mold 114 adjacent the inner mold surface 136. Specifically, the electric heating elements 116 extend longitudinally through the blow mold 114 (i.e., vertically through the first and second halves 130 and 132) along the entire height of the inner mold surface 136. The electric heating elements 116 heat the inner mold surface 136 and deliver heat to the preform 104/container 102 via the inner mold surface 136. The forming apparatus 140 may deliver heat to the preform 104/container 102 more efficiently and use less power than other forming apparatus because the electric heating elements 116 are positioned adjacent the inner mold surface 136 and do not heat the entire blow mold 114. The electric heating elements 116 focus heating on the inner mold surface 136 such that a higher percentage of heat is delivered to the preform 104/container 102 than to other components of the forming station 110. The arrangement of the electric heating elements 116 facilitates heating the outer surface of the container 102 to a higher temperature than the inner volume of the container. Accordingly, the container 102 undergoes an annealing process during formation which increases the crystallinity of the material of the container. As a result, the container 102 can be filled with products having a higher fill temperature than conventional containers made from similar materials.

When the blow mold 114 is in the closed blow molding position, the inner mold surface 136 extends circumferentially around a longitudinal axis 144 of the blow mold. The inner mold surface 136 defines the cavity 128 and provides a shape for the container 102. In some embodiments, the cavity 128 defined by the inner mold surface 136 has a cross-sectional shape defined perpendicular to the longitudinal axis 144 that is, for example and without limitation, circular, square, rectangular, triangular, or ovular. In addition, the inner mold surface 136 may include one or more projections or indents to form surface features on the walls of the container 102. The electric heating elements 116 are spaced circumferentially around the longitudinal axis 144. In the illustrated embodiment, the electric heating elements 116 are evenly spaced apart around the circumference of the cylindrical cavity 128. The electric heating elements 116 are configured to evenly heat the inner mold surface 136. In alternative embodiments, the electric heating elements 116 are arranged in any manner that enables the forming station 110 to operate as described herein. For example, in some embodiments, the electric heating elements 116 may be spaced different distances apart around the cavity 128. In such embodiments, the arrangement of the electric heating elements 116 with uneven spacing may be configured to evenly heat the inner mold surface 136 when accounting for the shape of the cavity 128.

A power source is operatively coupled to the electric heating elements 116 (e.g., via cables 146) and configured to provide electrical current to the electric heating elements 116. The controller 124 (shown in FIG. 2) is communicatively coupled to the electric heating elements 116 and configured to control a supply of electrical current from the power source to the electric heating elements according to a target temperature. For example, the controller 124 (shown in FIG. 2) may determine or receive a target temperature and control the electrical current supplied to the electric heating elements 116 in accordance with the target temperature. In some embodiments, the controller 124 may control the electrical current supplied to the electrical heating elements 116 such that two or more of the electric heating elements 116 receive different electrical power based on the position of the electric heating elements 116. For example, the controller 124 may control the electrical current supplied to the electric heating elements 116 to provide more electrical power to the electric heating elements 116 positioned in a middle portion of the blow mold 114 than the electric heating elements 116 positioned in an outer portion of the blow mold 114.

The controller 124 (shown in FIG. 2) may receive information from one or more sensors positioned on or near the blow mold 114. For example, temperature sensors may be positioned on or near the inner mold surface 136 and/or incorporated into the electric heating elements 116. The controller 124 (shown in FIG. 2) may control operation of the forming station 110 based on information received from the sensors. For example, the controller 124 may compare a sensed temperature to a target temperature and adjust the supply of electrical current to one or more of the electric heating elements 116 based on the comparison.

The frame 142 is coupled to and supports the blow mold 114. Specifically, the first half 130 and the second half 132 of the blow mold 114 are mounted to movable walls 148 of the frame 142. The base 134 is mounted to a stationary plate 150 of the frame 142. The frame 142 may include brackets, supports, beams, and any other components that enable the frame 142 to function as described herein.

The electric heating elements 116 are spaced from the frame 142 such that the electric heating elements 116 are closer to the inner mold surface 136 than to the frame 142. Also, the blow mold 114 includes a plurality of vents 152 defined between the blow mold 114 and the frame 142 to allow cooling air to flow between the heating elements 116 and the frame 142. In the illustrated embodiment, the vents 152 extend through each of the first half 130 and the second half 132 of the blow mold 114, and between the electric heating elements 116 and the frame 142. The configuration of vents 152 facilitates transferring a majority of the heat from the electric heating elements 116 to the inner mold surface 136, instead of to the frame 142. As a result, thermal expansion of the frame 142 and resulting misalignment issues discussed above are reduced. Additionally, in some embodiments, the system 100 may include a cooling apparatus 154 configured to further regulate a temperature of the frame 142. For example, the cooling apparatus 154 may include a pump 155 fluidly coupled to a plurality of cooling fluid channels 156 defined in and extending through the movable walls 148 and the stationary plate 150. The cooling apparatus 154 can be configured to pump a cooling fluid through the fluid channels 156 to help reduce the temperature of the frame 142 during the blow molding process, and thereby further reduce thermal expansion of the frame 142.

The base 134 includes the push-up portion 138, a heater assembly 158, a support 160, standoffs 162, and a mount 164. The push-up portion 138 is configured to contact the bottom of the container 102 to shape the bottom of the container. In some embodiments, the push-up portion 138 forms a recess in the bottom of the container 102. In some embodiments, at least a portion of the push-up portion 138 is movable relative to the container 102 and the mold halves 130 and 132 to facilitate shaping the container during the blow molding process. In the illustrated embodiment, for example, the push-up portion 138 is linearly movable in a vertical direction along the longitudinal axis 144 of the blow mold 114. In some embodiments, a movable push-up portion 138 facilitates removal of containers 102 from the blow mold 114 after the blow molding process.

The heater assembly 158 heats the push-up portion 138, which transfers heat to the bottom of the preform 104/ container 102. For example, the heater assembly 158 may include one or more electric heating elements that receive electrical current and heat the push-up portion 138. In alternative embodiments, the base 134 may include any heater assembly 158 that enables the system 100 to operate as described herein.

The support 160 is positioned below the push-up portion 138 and the heater assembly 158 and supports the push-up portion 138 and the heater assembly 158. In some embodiments, the support 160 is substantially hollow or open (e.g., a hollow cylinder) to reduce the amount of heat that is transferred from the heater assembly 158 towards the frame 142. The support 160 is attached to the frame 142 by the mount 164. The standoffs 162 extend between the support 160 and the mount 164 and define spaces between the support 160 and the mount 164 to further reduce heat transfer to the frame 142. In alternative embodiments, the base 134 is supported and mounted in any manner that enables the blow mold 114 to function as described herein.

Figure 7:
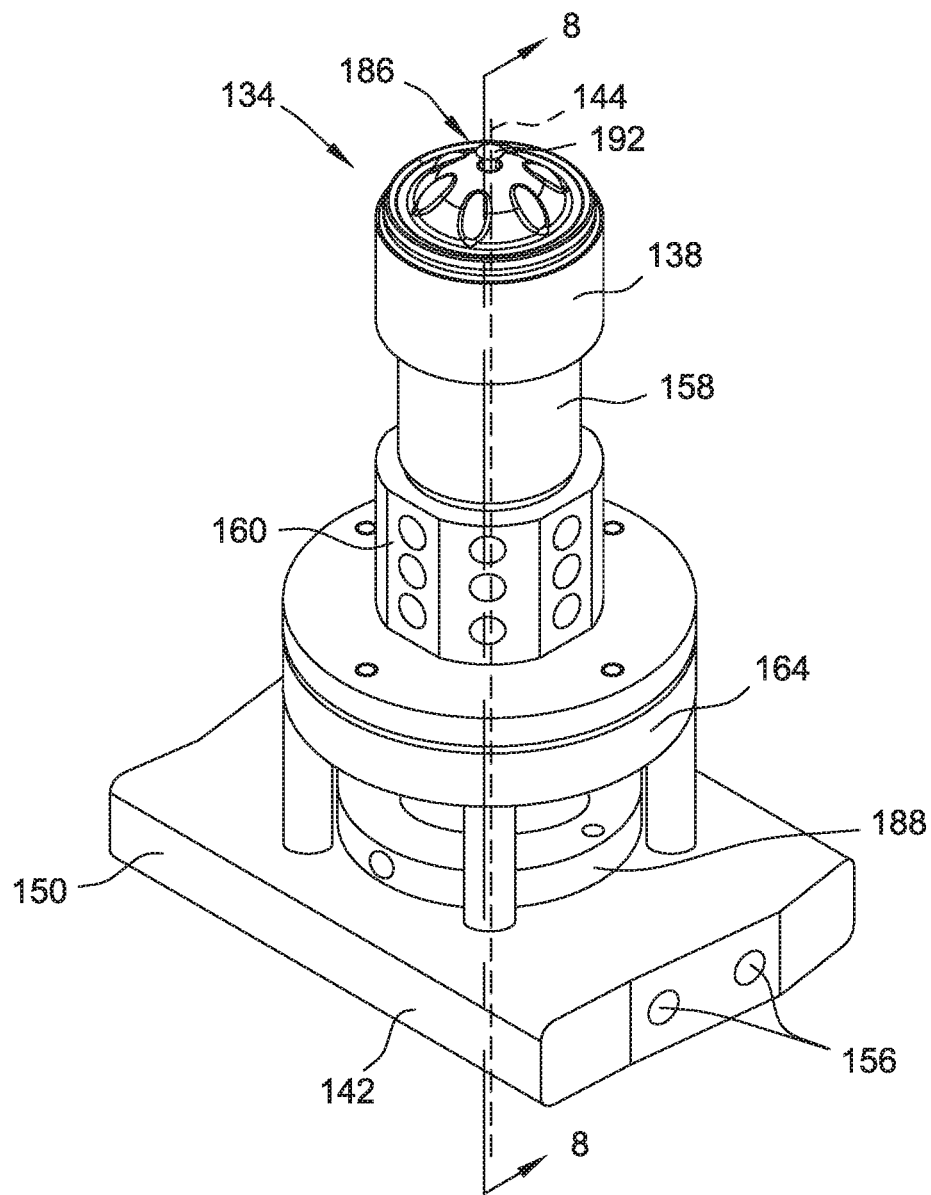
FIG. 7 is a perspective view of a base of the forming station shown in FIG. 3.
Figure 8:
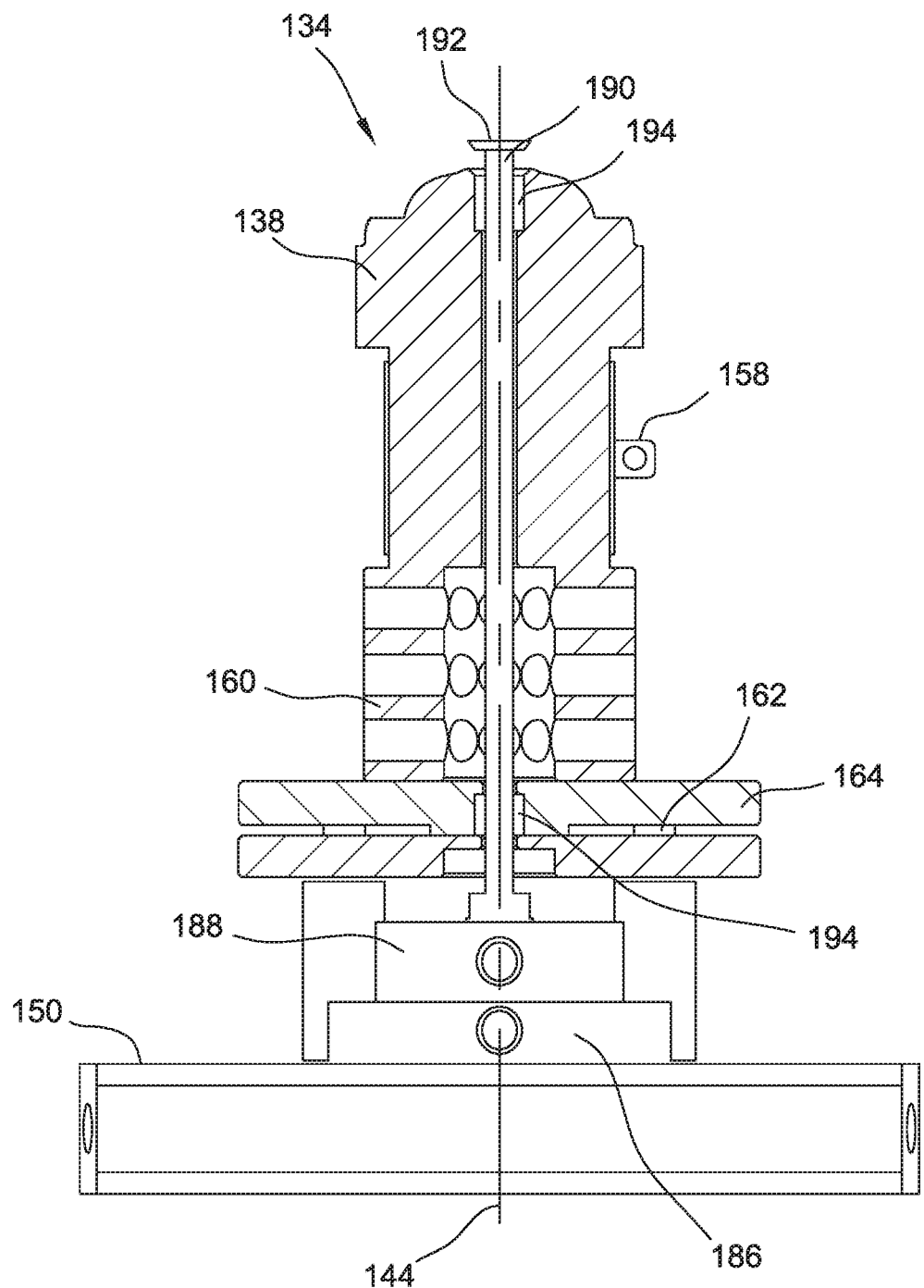
FIG. 8 is a sectional view of the base shown in FIG. 7, taken along section line 8-8.

FIG. 7 is a perspective view of the base 134 of the blow mold 114. FIG. 8 is a sectional view of the base 134, taken along section line 8-8. The base 134 includes a separation and support assembly 186 configured to support at least a portion of the container 102 as the blow mold 114 is opened. The separation and support assembly 186 may separate the container 102 from the push-up portion 138 of the base 134 to facilitate removal of the container 102 from the blow mold 114. The separation and support assembly 186 includes an actuator 188, a rod 190, and a movable pedestal 192. The actuator 188 may include, for example and without limitation, a pneumatic actuator, a hydraulic actuator, an electric actuator, and/or any other suitable actuator. The rod 190 extends along the longitudinal axis 144 and through the support 160, the mount 164, and the push-up portion 138. One end of the rod 190 is attached to the movable pedestal 192 and the other end is attached to the actuator 188. One or more guide bushings 194 may support the rod 190 and allow movement of the rod 190 relative to the support 160, the mount 164, and the push-up portion 138.

The actuator 188 is configured to cause displacement of the rod 190 along the longitudinal axis 144 and switch the movable pedestal 192 between a lowered position and a raised, support position. In the support position, the movable pedestal 192 is spaced a distance from the push-up portion 138 of the blow mold 114 and contacts a lower portion, e.g., a push-up portion, of the container 102. The movable pedestal 192 is sized and shaped to support the container above the push-up portion 138 of the blow mold 114 when the movable pedestal 192 is in the support position. Accordingly, the separation and support assembly 186 may prevent deformation of the container 102 as the blow mold 114 is opened and the container 102 is removed from the blow mold 114. Moreover, the separation and support assembly 186 may at least partially separate the container 102 from the push-up portion 138 of the blow mold 114 to prevent formation of a vacuum between the container and the blow mold 114 as the container 102 is removed from the blow mold 114. Accordingly, the blow mold 114 is able to use a higher operating temperature at the inner mold surface 136 because the separation and support assembly 186 supports the container 102 and facilitates removal of the container 102 from the blow mold 114 without deformation. The increased operating temperatures of the blow mold 114 result in increased crystallinity levels for the push-up portion of the container 102. In addition, the container 102 formed using the system 100 is able to hold products having higher temperatures with less container distortion than containers having lower levels of crystallinity.

Figure 9:
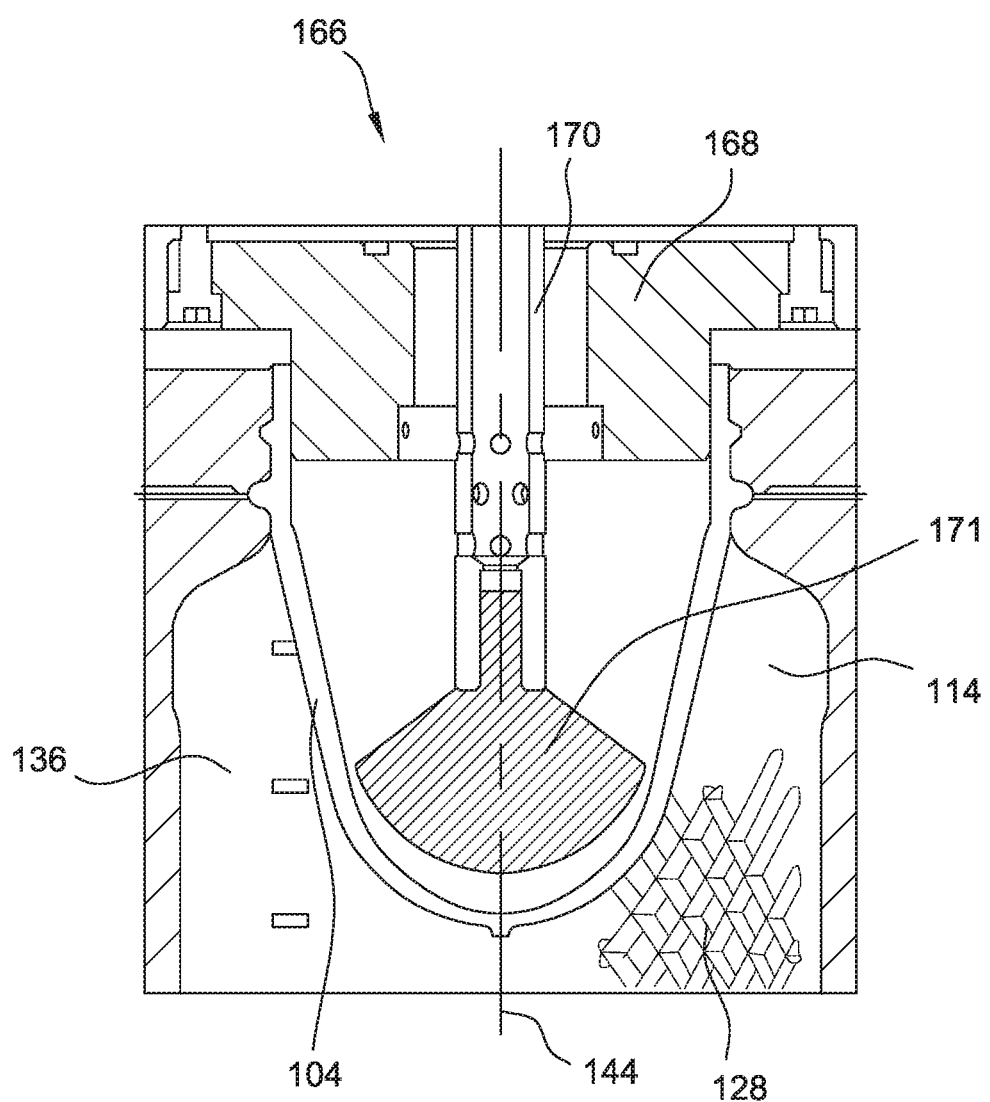
FIG. 9 is a side view of an exemplary embodiment of a shaping assembly for use with the system shown in FIG. 1.

FIG. 9 is a side view of an exemplary shaping assembly 166 suitable for use with the system 100 (shown in FIG. 1). For example, the forming station 110 (shown in FIG. 1) may include a shaping assembly such as the shaping assembly 166 shown in FIG. 9. In reference to FIGS. 3, 4, and 9, during operation, the blow mold 114 is configured to receive the preform 104 and the shaping assembly 166 is configured to initially shape and/or stretch the preform within the blow mold 114. The shaping assembly 166 includes a nozzle 168 and a stretching rod 170. When the preform 104 is provided to the forming station 110, the shaping assembly is aligned with and positioned within an open end of the preform 104 such that the nozzle 168 forms a hermetic seal with the preform 104. The preform 104 may be rotated to a desired orientation for aligning with the shaping assembly after the preform is formed at the forming station 110. The nozzle 168 is configured to inject air from a pressurized air supply into the preform 104 and direct the walls of the preform towards the inner mold surface 136. In some embodiments, the injection air is heated to a desired temperature for the blow molding process. In alternative embodiments, the preform 104 may be shaped in any manner that enables the system 100 to operate as described herein.

The stretching rod 170 is configured to extend into and contact the preform 104 to stretch the preform towards the base 134. For example, a tip 171 may be affixed at a distal end of the stretching rod 170 and is positioned and shaped to contact the preform 104 and stretch the preform towards the base 134. The stretching rod 170 is a cylinder and is configured to extend along the longitudinal axis 144 of the blow mold 114. In addition, the stretching rod 170 is movable in a direction parallel to the longitudinal axis 144 of the blow mold 114. During operation, the stretching rod 170 is moved downward, in reference to the orientation of the shaping assembly 166 shown in FIG. 9, to contact and stretch the bottom of the preform 104 towards the base 134. In alternative embodiments, the forming station 110 may include any stretching rod 170 that enables the system 100 to operate as described herein.

Figure 10:
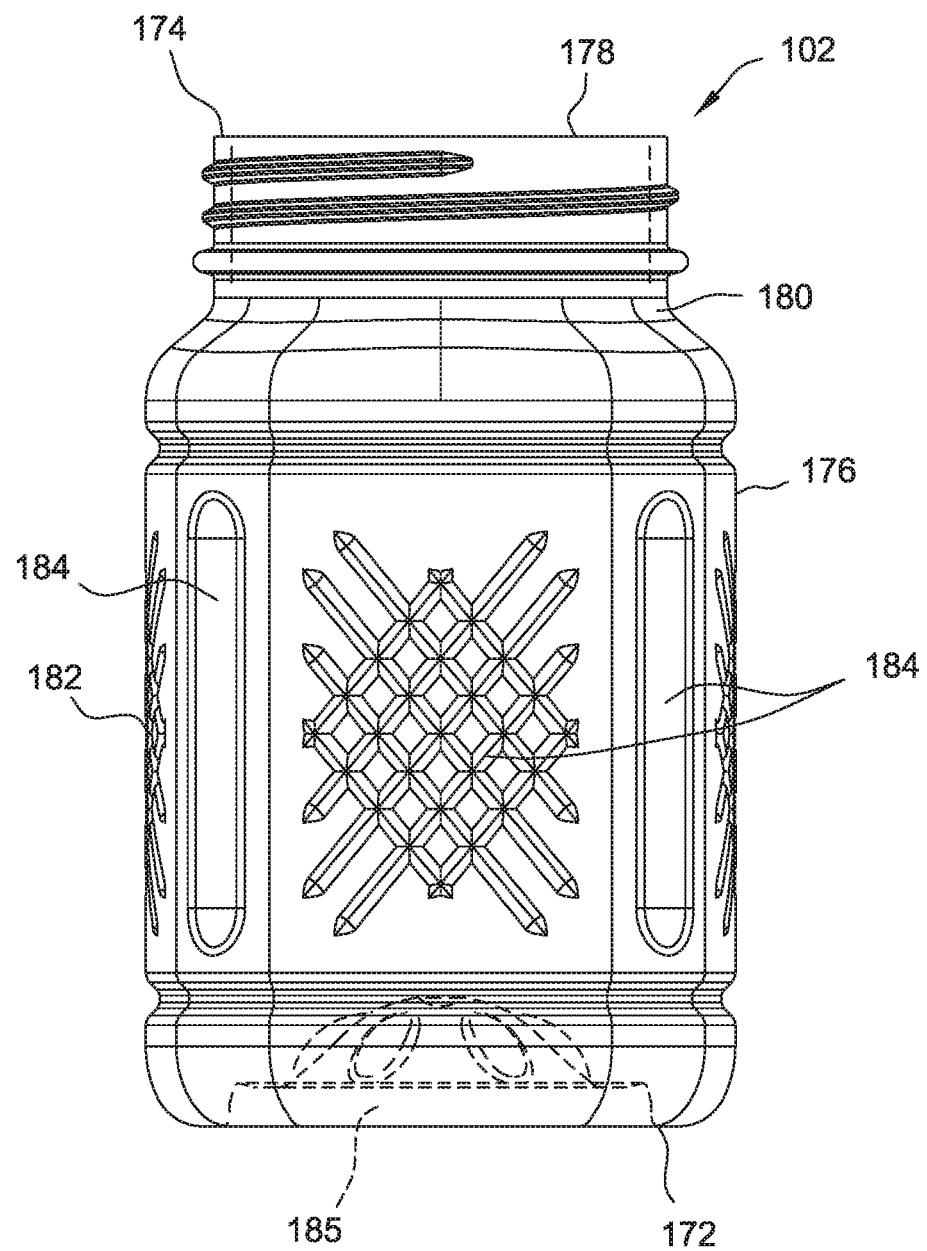
FIG. 10 is a side view of an exemplary embodiment of a container formed using the system shown in FIG. 1.
Figure 11:
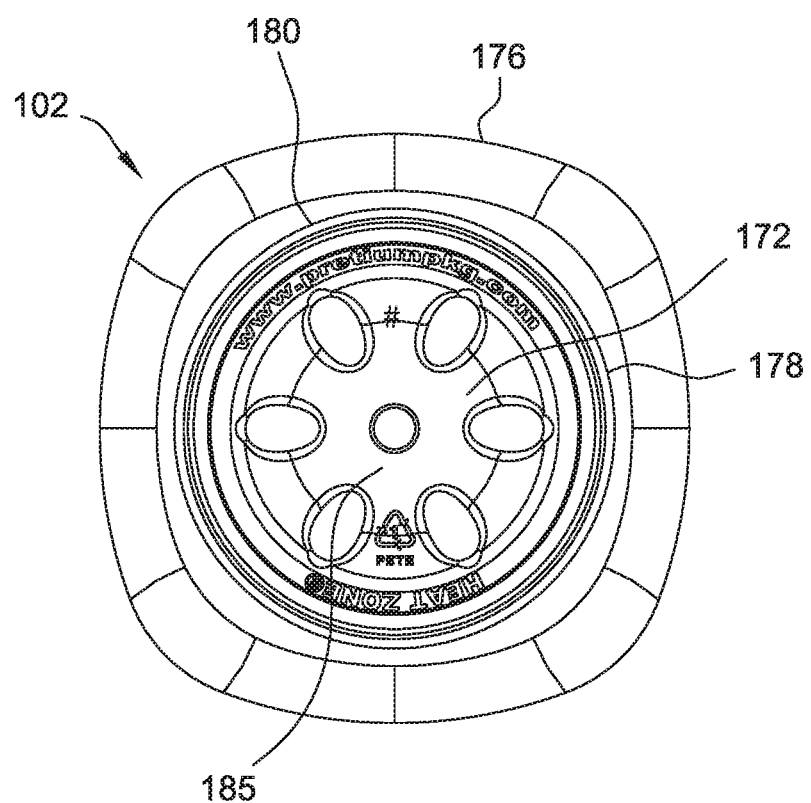
FIG. 11 is a bottom view of the container shown in FIG. 10.

FIG. 10 is a side view of an exemplary container 102 formed using the system 100 (shown in FIG. 1), and FIG. 11 is a top view of the container 102. In the illustrated embodiment, the container 100 has a relatively wide-mouth and is designed to hold a variety of goods including bulk solids (such as powders or prepared solid foods (e.g., pretzels or cookies)), liquids, and solids in liquid. As noted above, the container 102 may be formed from a variety of materials, including, for example and without limitation, plastic, polyethylene, polyethylene terephthalate, high density polyethylene, polypropylene, and polyvinyl chloride.

The container 102 includes a base 172, a top 174 opposite the base, at least one wall 176 extending between the base 172 and the top 174, and a push-up portion 185. Collectively, the base 172, the top 174, and the walls 176 define an interior volume of the container 102. The top 174 defines an opening 178, i.e., a mouth, for placing materials into the interior volume of the container 102. The upper portions of the walls 176 form a neck 180 extending downward from the top 174. The neck 180 has a smaller diameter than a body 182 of the container 102 and is threaded to receive a cap (not shown) for closing the opening 178 of the container 102.

The walls 176 include surface features, e.g., indentations or protrusions, 184. The surface features 184 may provide aesthetic appeal and/or information to a user. Also, the surface features 184 may form grips for holding or twisting the container 102. Moreover, the surface features 184 may provide structural strength in targeted areas of the container and/or reduce the amount of material required to form the container 102. Suitably, the blow mold process described herein allows for improved production of the surface features 184. For example, the system 100 is better able to control the formation of the surface features 184 than conventional systems because the system 100 includes the electric heating elements 116 positioned adjacent the inner mold surface 136 to provide precise control of the temperature of areas of the blow mold 114 during the blow molding process. In particular, the temperature of the blow mold 114 may be precisely controlled by individually controlling the heating elements in areas where the blow mold is configured to form the surface features 184 in the container 102. The temperatures may be selected to facilitate the preform 104 conforming to the desired surface features and/or accommodate heat transfer variations due to the surface features 184.

The push-up portion 185 extends upward from the base 172 and towards the top 174. The push-up portion 185 defines a cavity or recess on the bottom of the container 102. The push-up portion 185 may be any suitable shape. For example, the push-up portion 185 may be curved and have a dome-shape.

Containers formed in accordance with the systems and methods described herein, such as container 102, may have a relatively higher degree of crystallinity and maximum recommended fill temperature. More specifically, the use of electrical heating elements 116 as described above provides improved control of the temperature of areas of the blow mold 114 during the blow molding process. In particular, the temperature of the blow mold 114 may be precisely controlled by individually controlling the heating elements 116, which enables a higher degree of crystallinity in containers formed using the blow mold 114. This, in turn, allows the containers to tolerate higher maximum recommended fill temperatures without significant distortion. Thus, containers formed in accordance with the systems and methods described herein are particularly suited for use in "hot-fill" applications. In some embodiments, for example, polyethylene terephthalate containers formed in accordance with the systems and methods described herein may have a higher degree of crystallinity in critical areas of the container (e.g., along the container sidewall) and a maximum recommended fill temperature of at least 185° without the container sustaining substantial deformation due to the temperature of the fill material. In some embodiments, the containers may have a maximum recommended fill temperature of at least 190°. As used with reference to containers, the term "maximum recommended fill temperature" refers to the maximum temperature of contents (e.g., liquids) that may be used to fill the container without the container undergoing significant heat-related distortion or deformation.

Containers having substantially the same construction as the container 102 shown in FIG. 10 were formed in accordance with the systems and methods described herein. Each container included a base, a top opposite the base, a sidewall extending between the base and the top, and a push-up portion. The base, top, sidewall, and push-up portion were formed from polyethylene terephthalate using a blow mold having substantially the same configuration as the blow mold 114. During formation of the containers, electric heating elements of the blow mold were used to deliver heat to a preform through the blow mold inner surface to form each container. As a result, the containers had a relatively higher degree of crystallinity and maximum recommended fill temperature.

The containers were determined to have a maximum recommended fill temperature of at least 185° based on test results. During a test, a hot liquid fill material was heated to 186.4°. The temperature of the hot liquid fill material was maintained substantially constant for 15 minutes. The temperature of the hot liquid fill material was 186.2° after 15 minutes. The hot liquid fill material was injected into the containers and the temperature of the hot liquid fill material was periodically measured during the injection process. A first container was filled with hot liquid fill material with a measured temperature of 185.6°. A second container was filled with hot liquid fill material having a measured temperature of 187.1°. A third container was filled with hot liquid fill material having a measured temperature of 195.1°. The containers were visually inspected for heat-related distortion and deformation, and were found to have maintained a consistent shape and not undergo significant heat-related deformation. The containers filled with the hot liquid fill material were sealed and packaged. One week after sealing, the container seals were intact and the containers had not experienced significant deformation. Based on the measured temperatures and performance of the containers, the containers were determined to have a maximum recommended fill temperature of at least 185°.

Figure 12:
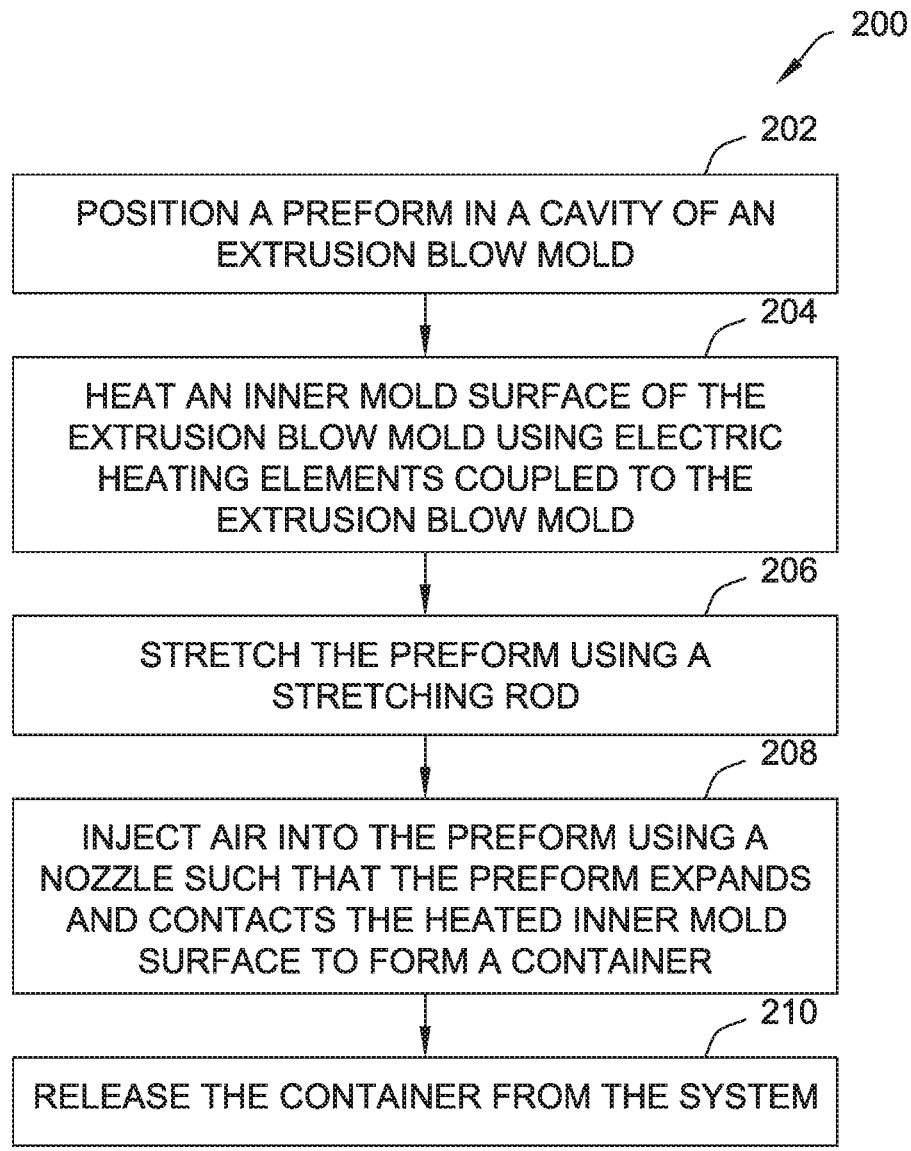
FIG. 12 is a flow diagram of a method of forming a container by blow molding.

FIG. 12 is a flow diagram of an exemplary method 200 of forming a container, such as the container 102, by blow molding. With reference to FIGS. 1-9 and 12, the method 200 includes positioning 202 a preform (e.g., preform 104) in the cavity of a blow mold (e.g., blow mold 114). For example, the preform is positioned between a first half (e.g., first half 130) and a second half (e.g., second half 132) of the blow mold when the blow mold is in an open position. The blow mold is moved from the open position to the closed blow molding position. A base (e.g., base 134) of the blow mold may be moved upward and positioned between the first half and the second half. In the closed blow molding position, the blow mold surrounds the preform.

The method 200 also includes heating 204 an inner mold surface (e.g., inner mold surface 136) of the blow mold using electric heating elements (e.g., electric heating elements 116) coupled to the blow mold. The electric heating elements are arranged in the blow mold adjacent the inner mold surface. Accordingly, the electric heating elements deliver heat to the preform through the inner mold surface. In some embodiments, electrical current is provided to the electric heating elements using a power source operatively coupled to the electric heating elements. For example, a controller (e.g., controller 124) is communicatively coupled to the heating elements and controls the supply of electrical current to the heating elements according to a target temperature. In some embodiments, the controller individually controls the supply of electrical current to each heating element according to a target temperature associated with the respective heating element.

In some embodiments, cooling air is directed through vents between the heating elements and a frame (e.g., frame 142). The cooling air reduces the amount of heat that is transferred from the electric heating elements to the frame.

The method 200 further includes stretching 206 the preform using a stretching rod (e.g., stretching rod 170), and injecting 208 air into the preform using a nozzle (e.g., nozzle 168) such that the preform expands and contacts the heated inner mold surface to form the container. In some embodiments, the nozzle injects a first pressurized airflow having a first pressure for a first time and injects a second pressurized airflow having a second pressure for a second time. The first pressurized airflow may be a "preblow air" that directs the sidewall of the preform towards the inner mold surface as the stretching rod contacts the bottom of the preform. The first pressurized airflow stretches the preform towards the base. The second pressurized airflow may have a higher pressure than the first pressurized airflow and may be injected after the first pressurized airflow. The second pressurized airflow continues stretching the preform and shapes the preform to the inner mold surface. The second pressurized airflow is maintained until the stretching of the preform is completed.

In some embodiments, after formation of a container (e.g., container 102), pressurized air within the cavity of the blow mold is vented to facilitate cooling of the container. For example, a vent of the blow mold may be sequenced between open and closed positions to selectively exhaust the pressurized air. The controller may control the venting to facilitate heat setting, control shrinkage, and provide cooling of the container.

In addition, the method 200 includes releasing 210 the container from the system. For example in some embodiments, a movable pedestal (e.g., movable pedestal 192 of separation and support assembly 186) is raised from a lowered position adjacent a push-up portion (e.g., push-up portion 138) of the base to a support position (shown in FIGS. 7 and 8) adjacent the base of the container. The movable pedestal supports the base of the container and helps to separate the container and the blow mold. With the movable pedestal in the support position, the blow mold is switched to the open position. The container may be lifted above the push-up portion of the base and/or the push-up portion of the base may be lowered to allow separation of the container and the blow mold. The separation and support assembly relieves tension and adhesion between the container and the push-up portion of the base and prevents formation of a vacuum between the container and the push-up portion as the container is removed from the blow mold. After removal from the blow mold, the container is transported from the forming station to the removal station where the container is released from the system. In some embodiments, releasing 210 the container includes opening a thread that holds the container on the carriage of the transport apparatus.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for forming a container, the system comprising:
    an injection station configured to inject a liquid material into a mold to form a preform;
    a forming station including an apparatus for forming a container, the apparatus comprising:
        a blow mold configured to receive the preform and inject air into the preform to form the container, wherein the blow mold includes an inner mold surface and an outer surface positioned opposite the inner mold surface;
        at least one stretching rod configured to contact the preform in the blow mold and stretch the preform; and
        electric heating elements coupled to the blow mold and positioned adjacent the inner mold surface to heat the inner mold surface, wherein each electric heating element is positioned closer to the inner mold surface than to the outer surface; and
    a removal station configured to release the container from the system.

2. The system of claim 1, wherein the blow mold includes a first half, a second half, and a base, the first half and the second half collectively defining the inner mold surface, the base including a push-up portion, wherein the electric heating elements are positioned in the first half and the second half adjacent the inner mold surface.

3. The system of claim 2, wherein the blow mold is positionable between a closed blow molding position and an open position, the forming station including a separation and support assembly including a movable pedestal arranged to support the container as the blow mold is positioned between the closed blow molding position and the open position.

4. The system of claim 1, wherein the inner mold surface extends circumferentially around a longitudinal axis of the blow mold, and wherein the electric heating elements are spaced circumferentially around the longitudinal axis.

5. The system of claim 1 further comprising a conditioning station configured to adjust a temperature of the preform.

6. The system of claim 5 further comprising a transport apparatus configured to transport the container to at least one of the conditioning station, the injection station, the forming station, and the removal station.

7. The system of claim 1 further comprising a power source operatively coupled to the electric heating elements and configured to provide electrical current to the electric heating elements, wherein the forming station further comprises a controller communicatively coupled to the electric heating elements and configured to control a supply of electrical current from the power source to the electric heating elements according to a target temperature.

8. The system of claim 1, wherein the forming station further comprises a frame coupled to and supporting the blow mold, and wherein the blow mold includes a plurality of vents configured to allow cooling air to flow between the electric heating elements and the frame.

9. An apparatus for forming a container, the apparatus comprising:
    a blow mold configured to receive a preform and inject air into the preform to form the container, wherein the blow mold includes a first half, a second half, and a base, the first half and the second half collectively defining an inner mold surface and an outer surface positioned opposite the inner mold surface, the base including a push-up portion, wherein the blow mold is positionable between an open position and a closed blow molding position;
    at least one stretching rod configured to contact the preform within the blow mold and stretch the preform while the air is injected into the preform; and
    electric heating elements positioned in the first half and the second half adjacent the inner mold surface to heat the inner mold surface, wherein each electric heating element is positioned closer to the inner mold surface than to the outer surface.

10. The apparatus of claim 9 further comprising a controller communicatively coupled to the electric heating elements and configured to control a supply of electrical current to the electric heating elements according to a target temperature.

11. The apparatus of claim 9 further comprising a frame, wherein the blow mold is coupled to the frame, and wherein the blow mold includes a plurality of vents configured to allow cooling air to flow between the electric heating elements and the frame.

12. The apparatus of claim 9, wherein the inner mold surface extends circumferentially around a longitudinal axis of the blow mold, and wherein the electric heating elements are spaced circumferentially around the longitudinal axis when the blow mold is in the closed blow molding position.

13. The apparatus of claim 9 further comprising a power source operatively coupled to the electric heating elements and configured to provide electrical current to the electric heating elements.

14. A method of forming a container by blow molding, the method comprising:
    positioning a preform in a cavity of a blow mold, wherein the blow mold includes an inner mold surface defining the cavity and an outer surface positioned opposite the inner mold surface;

heating the inner mold surface using electric heating elements coupled to the blow mold, wherein the electric heating elements are positioned adjacent the inner mold surface, wherein each electric heating element is positioned closer to the inner mold surface than to the outer surface;

stretching the preform using at least one stretching rod; and injecting air into the preform such that the preform expands and contacts the heated inner mold surface to form the container.

15. The method of claim 14 further comprising providing electrical current to the electric heating elements using a power source operatively coupled to the electric heating elements.

16. The method of claim 14 further comprising controlling, using a controller communicatively coupled to the electric heating elements, a supply of electrical current to the electric heating elements according to a target temperature.

17. The method of claim 16, wherein controlling a supply of electrical current to the electric heating elements comprises individually controlling the supply of electrical current to each electric heating element according to a target temperature associated with the respective electric heating element.

18. The method of claim 14, wherein injecting the air into the preform to form the container comprises:

injecting a first pressurized airflow having a first pressure for a first time; and injecting a second pressurized airflow having a second pressure for a second time.

19. The method of claim 14, wherein the blow mold includes a first half, a second half, and a base, the first half and the second half collectively defining the inner mold surface, the base including a push-up portion, the method further comprising positioning the blow mold between an open position and a closed blow molding position.

20. The method of claim 19 further comprising moving a separation and support assembly to a support position to support the container when the blow mold is positioned between the open position and the closed blow molding position.

21. The method of claim 14 further comprising directing cooling air through a plurality of vents between the electric heating elements and a frame coupled to and supporting the blow mold.

22. The method of claim 14 further comprising transporting the container to a removal station and releasing, at the removal station, the container.

* * * * *